United States Patent
Lohweg et al.

(10) Patent No.: US 9,947,163 B2
(45) Date of Patent: Apr. 17, 2018

(54) AUTHENTICATION OF SECURITY DOCUMENTS AND MOBILE DEVICE TO CARRY OUT THE AUTHENTICATION

(71) Applicant: KBA-NOTASYS SA, Lausanne (CH)

(72) Inventors: Volker Lohweg, Bielefeld (DE); Jan Leif Hoffmann, Lage (DE); Helene Dörksen, Kaltenkirchen (DE); Roland Hildebrand, Lage (DE); Eugen Gillich, Bielefeld (DE); Jürg Hofmann, Burgdorf (CH); Johannes Georg Schaede, Würzburg (DE)

(73) Assignee: KBA-NotaSys SA, Lausanne (CH)

( * ) Notice: Subject to any disclaimer, the term of this patent is extended or adjusted under 35 U.S.C. 154(b) by 119 days.

(21) Appl. No.: 14/764,061

(22) PCT Filed: Feb. 4, 2014

(86) PCT No.: PCT/IB2014/058776
§ 371 (c)(1),
(2) Date: Jul. 28, 2015

(87) PCT Pub. No.: WO2014/118763
PCT Pub. Date: Aug. 7, 2014

(65) Prior Publication Data
US 2016/0012658 A1   Jan. 14, 2016

(30) Foreign Application Priority Data
Feb. 4, 2013  (EP) ..................................... 13153923

(51) Int. Cl.
*G06K 9/00* (2006.01)
*G07D 7/20* (2016.01)
(Continued)

(52) U.S. Cl.
CPC ............ *G07D 7/20* (2013.01); *G06K 9/00442* (2013.01); *G06K 9/00516* (2013.01); *G06K 9/22* (2013.01);
(Continued)

(58) Field of Classification Search
None
See application file for complete search history.

(56) References Cited

U.S. PATENT DOCUMENTS

| 5,483,602 A | 1/1996 | Stenzel et al. |
| 8,781,204 B2 | 7/2014 | Lohweg et al. |

(Continued)

FOREIGN PATENT DOCUMENTS

WO  WO 2008/146262    12/2008
WO  WO 2011018764 A2 *  2/2011  ........... G07D 7/0006

OTHER PUBLICATIONS

International Search Report for PCT/IB2014/058776, dated May 21, 2014, 5 pages.
(Continued)

*Primary Examiner* — Sean Conner
(74) *Attorney, Agent, or Firm* — Nixon & Vanderhye P.C.

(57) ABSTRACT

A method of authenticating security documents and a mobile device, especially a smartphone, programmed to carry out the method, based on an analysis of features which are produced by intaglio printing, which analysis involves a decomposition of sample images of a candidate document to be authenticated based on Wavelets, each sample image being digitally processed by performing a Wavelet transform of the sample image in order to derive a set of classification features. The method is based on an adaptive approach, which includes the following steps: —prior to carrying out the Wavelet transform, defining a categorization map containing local information about different intaglio line struc- (Continued)

(a)   (b)   (c)

tures that are found on the security documents; —carrying out a Wavelet selection amongst a pool of Wavelet types based on the categorization map; and —performing the Wavelet transform of the sample image on the basis of the selected Wavelet.

13 Claims, 11 Drawing Sheets

(51) Int. Cl.
*G06K 9/22* (2006.01)
*G06K 9/48* (2006.01)
*G06T 7/00* (2017.01)
*G06T 7/168* (2017.01)
*G07D 7/00* (2016.01)

(52) U.S. Cl.
CPC .............. *G06K 9/48* (2013.01); *G06T 7/0002* (2013.01); *G06T 7/168* (2017.01); *G07D 7/003* (2017.05); *G07D 7/2016* (2013.01); *G06K 2009/488* (2013.01); *G06T 2207/20064* (2013.01); *G06T 2207/30176* (2013.01)

(56) References Cited

U.S. PATENT DOCUMENTS

| | | | |
|---|---|---|---|
| 2008/0267514 A1 | 10/2008 | Alasia et al. | |
| 2010/0002929 A1* | 1/2010 | Sammak | G06K 9/00127 382/133 |
| 2010/0195894 A1* | 8/2010 | Lohweg | G07D 7/0006 382/135 |
| 2012/0328179 A1* | 12/2012 | Glock | G07D 7/0006 382/135 |
| 2014/0153785 A1* | 6/2014 | Shelef | G06T 7/168 382/109 |

OTHER PUBLICATIONS

Written Opinion of the ISA for PCT/IB2014/058776, dated May 21, 2014, 8 pages.
Lohweg et al., "Banknote Authentication with Mobile Devices", Proceedings of SPIE-IS&T Electronic Imaging, SPIEL, vol. 8665, Feb. 21, 2013, pp. 866507-1 through 866507-14.

* cited by examiner

Fig. 7(e)  j = 257

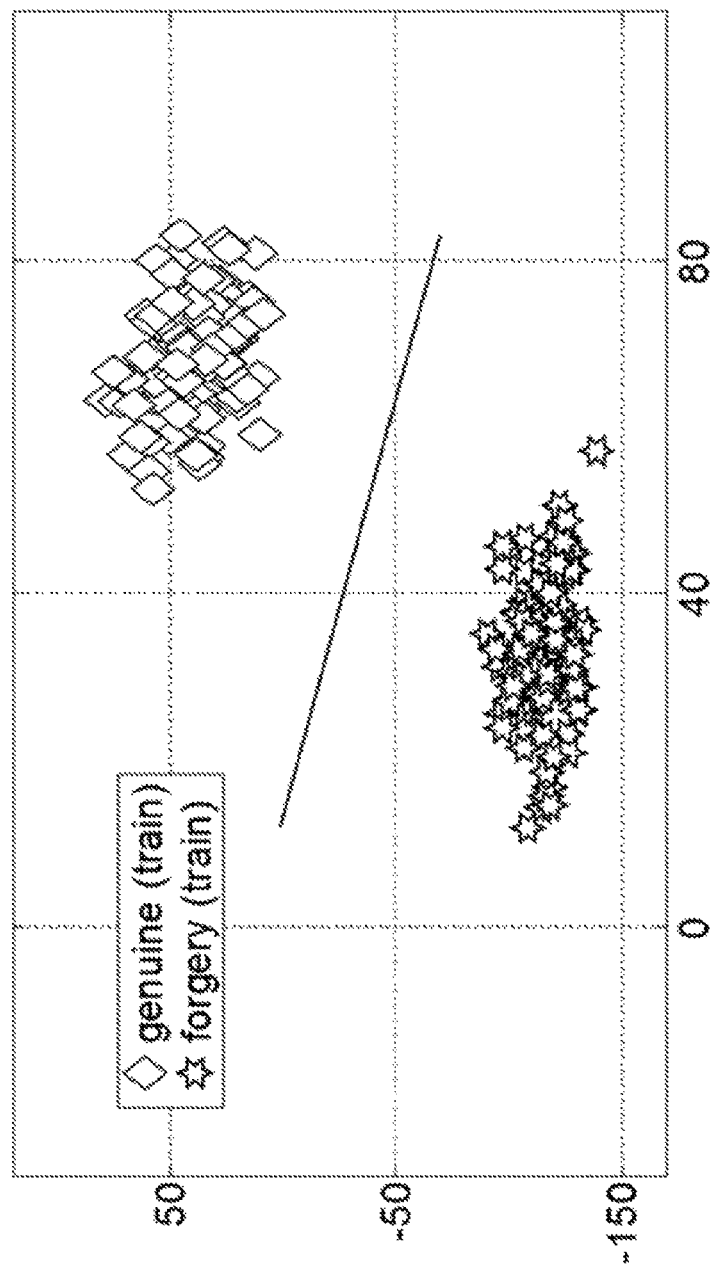

AUTHENTICATION OF SECURITY DOCUMENTS AND MOBILE DEVICE TO CARRY OUT THE AUTHENTICATION

This application is the U.S. national phase of International Application No. PCT/IB2014/058776 filed 4 Feb. 2014, which designated the U.S. and claims priority to EP Patent Application No. 13153923.1 filed 4 Feb. 2013, the entire contents of each of which are hereby incorporated by reference.

1. INTRODUCTION

Maintaining confidence in security documents, especially banknotes, is and remains a major concern for the central banks in order to maintain the stability of the economy around the world. A particularly suitable approach for banknote authentication is based on the so-called Sound-of-Intaglio™ approach, cf. [1], [2] (see also International Patent Publication No. WO 2008/146262 A2), which focuses on the analysis of intrinsic features produced by intaglio printing (the Sound-of-Intaglio™ designation is a trademark of KBA-NotaSys SA). The result is a universal algorithm, based on image processing and pattern recognition which detects intrinsic information to distinguish between banknotes with genuine intaglio, regardless of mint or worn out conditions, or even counterfeits. This is because intaglio printing enables the printing of very fine, high resolution and sharply-defined patterns. Also, intaglio is the most resistant printed feature which gives the methodology a certain advantage in robustness under the conditions of circulation. Therefore, intaglio is identified "as it is" as an intrinsic feature and can serve as a secure method of identification for the public. The vast majority of counterfeits retrieved by police forces and banks are created with methods and equipment which are commercially available. Intaglio has proved to be the most reliable and secure platform for defence against counterfeits. Though intaglio features are not consciously recognized by the public, the unmistaken optical appearance in combination with the unique tactile properties (both to be seen in combination with the printing substrate) is the key to the habitual recognition of genuine notes for the users. This method identifies the unique features of intaglio with affordable image analysis tools by using e.g. mobile telephones. Of course, the general approach can also be useful for central banks in sorting and forensics. Furthermore, an advantage of the concept is that there is no need for the central banks to disclose any secret information like special properties, geometries etc. and specifically no need to re-design existing banknotes, provided that the intaglio reaches a certain quality level. Additionally, intaglio represents one of the important differentiations to commercial prints and is a substantial part of the printing process of banknotes. The research focuses actually on the possibility of using intaglio for automated applications in the cash cycle. For this reason, Sound-of-Intaglio™ offers a future frame for manufacturers of payment terminals or banking systems to secure the gap ahead and against the increasing quality of counterfeits in circulation. So far, the counterfeit technologies are unsuccessful in providing acceptable simulations of intaglio or even to use the technology for criminal purpose.

In addition to the "proved" mass counterfeits on commercial offset presses, the continuous progress in digital desktop technologies (scanners, cameras, and digital office printers) has established a complete new class of "digital" counterfeits (digifeits). Due to the strict non-proliferation policy in the printing industry, the high definition banknote intaglio process in its totality (design, origination, plate making and printing) is well protected against its use or abuse in counterfeit applications. With the uniqueness of the intaglio process for the security of banknotes, its unmistakable appearance and the function in public circulation, it is most sensible to directly identify genuine banknotes by identifying the presence of intaglio. As the direct measurement of 3D-structures under the rough and challenging conditions of circulation have proved to be difficult and lacking robustness, a completely different approach has been sought, which exploits the unique opacity and appearance of common high quality intaglio structures.

Described hereafter is an image processing and pattern recognition approach which is based on the Sound-of-Intaglio™ approach [1] for use in smart mobile devices such as smartphones [4] and the like [3]. The concept is based on a new strategy of constructing adaptive Wavelets for the analysis of different print patterns on a banknote. Furthermore, a banknote specific feature vector is generated which describes an authentic banknote effectively under various illumination conditions. A multi-stage Linear-Discriminant-Analysis (LDA) classifier generates stable and reliable output.

The present application is organized as follows: After this introduction, related work and prerequisites will be highlighted in the second section, where the focus is on related publications, some technology aspects of mobile devices, and Wavelet-Based Intaglio Detection (WIBD). In the third section an adaptive Wavelet approach for banknote authentication on smartphones will be described. The fourth section is dedicated to results, and the fifth section concludes the present description.

2. RELATED WORK AND PREREQUISITES

2.1 Related Publications

In the last ten years several publications regarding the detection of banknote denominations and authentication as such have been published. Not more than approx. 300 publications are detected in the SPIE, IEEE, and ACM databases during the above mentioned years. Most of the publications describe optical scanning techniques and signal processing algorithms in their approaches. Only a few authors suggest other than optical concepts, e.g. [5], [6]. The vast majority of published work is related to feature extraction and machine learning, e.g. [7], [8], and [9]. Some recent publications have also shown that a Wavelet approach seems to be promising in identification [10] and recognition [11] of banknote denominations. Especially, Wavelet-based concepts support the general approach of [1] and the subjacent Wavelet-based authentication theory [2], [3], and [12].

2.2 Mobile Device Technology

In this section, key components of mobile devices are described, especially key components of state-of-the-art smartphones. The focus is on the camera module, because this is the smartphone's key element if used as an image processing device.

Definition

A mobile phone is called a smartphone if it has the capability to be extended with small software applications (apps) and if it offers a more advanced computing ability and enhanced connectivity [13]. The increasing processor performance in recent years led to a hugely shifting usage behavior: At the beginning, smartphones were used to e-mail or to text in a more convenient way, mainly by business users. Today, smartphones can run third-party apps, which extend the functionality by far. The smartphone is not only a mobile telephone, but also a notebook, compact camera, gaming companion, music player, internet surf station, satellite navigation tool and so on. The most important market players use essentially two different operating systems: Apple iOS and Google Android. They share 86.3% [14] of all smartphones in the field, sold worldwide in the third Quarter 2012, with Android being the biggest player with a market share of 72.4% [14].

General Hardware.

Usually, smartphones are equipped with a large display. Since the advent of Apple's iPhone in 2007, large high-resolution multi-touch displays have become a de-facto standard. The highest resolution (326-pixel-per-inch-display) is offered by Apple [15]. The Samsung Galaxy Note N7000, one of the largest smartphones currently on the market, is equipped with a screen size of 5.3 inch [16]. Furthermore, smartphones have a broad collection of sensors, e.g. gyroscope, accelerometer, GPS, proximity or light. The first smartphones used a single core processing unit with a clock rate of 600 MHz. Yet today, multi-core processors (four to five cores) and clock rates of about 1.5 GHz are built in high sophisticated models [17], [18]. A smartphone usually has two cameras which are described in the next paragraph.

Camera Unit.

Typical smartphones employ two different types of cameras: one at the screen side for video phone calls, and one on the back. Usually, the first one has a resolution of about one megapixel, while the other camera typically offers a higher sensor resolution and is designed to be a replacement for a still or video camera. Since this is the camera for applications in image processing, the term camera is used henceforth for high-resolution cameras and the other type of camera is neglected. A typical smartphone camera has a resolution between five and twelve megapixels, with a trend to a larger amount of pixels. As with other compact cameras with low-quality optics, it does not mean that the result improves. Camera modules in smartphones lack a zoom lens (niche models like the Nokia Pureview 808 are ignored at this point). These cameras have a sensor with a typical diagonal width of 4 to 7 mm, which makes them prone to noise. The built-in illumination, often a LED- or Xenon-based flash, is only capable to illuminate objects near to the lens, e.g. portraits or close-ups.

Large resolution leads to large memory demand. Today, this is why it is not possible to get raw image data, which is important in image processing. The result of an image capturing process is always a jpg-compressed picture. However, it can be said that in general the compression factor is decreasing based on the state-of-art of smartphone technology.

2.3 Banknote Applications for Mobile Devices

The vision of using mobile devices for banknote authentication is not new as such. Different publications have cited such kind of applications, e.g. [3], [4], and [19]. The basic idea is to use the integrated camera, the illumination unit, and the processing unit to analyse different overt and covert banknote features and to classify the banknotes. Another approach was recently published which is based on a pocket scanner equipped with optical near infrared point light sources and a low power sensor chip. This system can be connected to any mobile phone [20]. The technology imitates some of the basic concepts of ATM manufacturers. Besides these apps some more exist which can be used as banknote presentation applications, e.g. [21], [22].

2.4 Wavelet-Based Intaglio Detection (WIBD)

In this subsection the general concept of Wavelet-Based Intaglio Detection (WBID) as taught for instance in [1] is described, which concept involves the decomposition of one or more sample images of a document to be authenticated by performing digital signal processing techniques based on Wavelets. For further details of the concept and related variants reference can be made to the corresponding literature which is incorporated herein by reference in its entirety, in particular [1], [2], [3], [4], and [12], as well as International Patent Publications Nos. WO 2008/146262 A2 and WO 2011/018764 A2.

Wavelets. A Wavelet is a mathematical function used to divide a given function or signal into different scale components. A Wavelet transform is the representation of the function or signal by Wavelets. Wavelet transforms have advantages over traditional Fourier transforms for representing functions and signals that have discontinuities and sharp peaks. According to the present approach, one in particular exploits the properties of so-called discrete Wavelet transforms (DWTs) as this will be discussed in the following. Wavelet theory will not be discussed in-depth in the present description as this theory is well-known per se and is extensively discussed and described in several textbooks on the subject. The interested reader may for instance refer to the cited books and publications about Wavelet theory [23], [24], [25], and [26].

To recognize local features, it is important that the signal transform is shift invariant. This means that a signal shift by $\Delta$ samples may lead to a shift of scaling or detail coefficients, but not to a modification of their values. This property guarantees that a scale diagram does not depend on the selection of the zero point on a scale. Using the Fast Wavelet Transform (FWT), this shift invariant property is lost due to the inherent sub-sampling of the FWT. Consequently, Wavelet coefficients resulting from the FWT show a high dependency on signal shifts. By sub-sampling when progressing to the next transform scale, one also runs the risk of forfeiting important information about edges. Hence, it is crucial to apply a signal transform that is shift invariant. To attain a shift invariant transform, one determines the transform without the sub-sampling of a signal s[n]. This condition is met by the shift-invariant Wavelet Transform (SWT) [27], [28]. For shifted, but otherwise identical signals, SWTs provide shifted, but identical Wavelet coefficients. As no sub-sampling is used a redundant signal representation is gained [27], [28]. For transforming two-dimensional banknote images into spectral descriptions, two one-dimensional transforms are applied [28]. This is valid because images can be interpreted as separable signals [25]. To transform a two-dimensional signal x, the one-dimensional transform algorithm alternately on the image rows n and the image columns in are employed. This results in a square matrix x with the dimensions (2n×2m):

$$X = \begin{bmatrix} A_y \\ D_y \end{bmatrix} = \begin{bmatrix} A & cV \\ cH & cD \end{bmatrix} \quad (1)$$

Now, the Wavelet-transformed signal is divided into four sub-images: Scaling coefficients A (lowpass-filtered, φ) and vertical detail coefficients cV (bandpass-filtered, ψ) belonging to $A_y$, and horizontal as well as diagonal detail coefficients (cH and cD, bandpass-filtered, ψ) are comprised in $D_y$. The detail matrices cV, cH, and cD describe the same structure of the Wavelet-transformed signal of the image. In a second step the detail coefficients are combined to a general detail matrix cG:

$$cG = \alpha \cdot (cV + cH + cD), \alpha \in R_+, \quad (2)$$

with α being a scale factor which guarantees the same dynamic range for the scaling coefficients and the details coefficients, if necessary. With cG all recognized structure transitions are united in one matrix. It should be noted that one cannot retrieve the signal from the united detail coefficients cG. When authenticating banknotes, though, this aspect is irrelevant. The above-mentioned calculation in respect of Equation (2) is executed for each scale. For details one can refer to [12] and WO 2011/018764 A2. In order to process a Wavelet transform it is necessary to fit a Wavelet to the application. In general, good results are achieved with Daubechies Wavelets [23] with two vanishing moments (db2-Wavelet). These Wavelets are on average well suited for spectral analysis of fine intaglio structures because of their compact support and frequency response [12].

Classification. The use of moment-based statistical features of Wavelet coefficients is advantageous, cf. [3], [12], and [29]. In FIG. 1 different greyscale frequency histograms of db2-SWT coefficients $H_n(p)$ are shown based on a typical intaglio line structure of a "Jules Verne" banknote specimen produced by the Applicant as generally depicted in FIG. 7(a) (part of which banknote specimen is also illustrated in FIG. 2). Banknote specimens are archetype banknotes with genuine paper, inks, applications, etc., but have no value. The banknote specimens "Jules Verne" and "Flowerpower" which are being referred to in this application are designed and produced by the Applicant.

The complete banknote specimen is shown in FIG. 7(a). It is intuitive that the greyscale frequency distribution of genuine banknotes differs considerably from forged ones.

By calculating descriptive measures on standardized histograms $H_n(p)$ global conclusions on the image structure can be discussed. The following statistical features are taken into account for further analysis of the Wavelet coefficients, namely variance $\sigma^2$, skewness E and excess (or kurtosis) C. Variance $\sigma^2$ depicts the amplitude distribution of the Wavelet coefficients around the histogram center. Skewness E describes the symmetry of the distribution around the center. Excess/kurtosis C describes the deviation relative to the Gaussian distribution, cf. [29]. FIG. 3 shows the feature space containing object classes which are to be classified, using the aforementioned statistical features as a set of classification features (or coordinates) of the feature space.

Generally, the above-mentioned features are not sufficient for discriminating a complex feature space uniquely. One has to keep in mind that not only newish, but worn out genuine and forged banknotes also have to be distinguished correctly. One approach to achieve a more accurate linear classification is to consider additional features. The additional features have to fulfil two important properties. First, they have to be suitable for recognition of intaglio printing, and second, they have to be complementary to the existing three statistical features. One applies three typical statistical moments (variance $\sigma^2$, skewness E, and kurtosis C). Three others, so-called LACH features $\overline{H}_L$, $\overline{H}_M$ and $\overline{H}_R$ [4], have to be interpreted as Local Adaptive Cumulative Histogram (LACH) statistics which generate the features $\overline{H}_i(\sigma^2)$, $I \in \{L, M, R\}$, controlled by the variance $\sigma^2$. They represent areas of the meaningful parts of the histogram, separated into parts using $\sigma^2$ (L for the left part, M for middle, R for right). Since most of the features are Gaussian distributed [4], one applies a Linear Discriminant Analysis (LDA) approach [4] for the calculation of the classifier boundary for the later authentication.

3. APPROACH

The approach is based on the fact that signal processing algorithms for smartphones, if used as image processing units, have to fulfil some criteria regarding robustness and adaptivity. This section describes findings for robust and adaptable feature generation for intaglio detection.

Methods of authenticating security documents (especially banknotes) based on an analysis of intrinsic features of the security documents which are produced by intaglio printing, which analysis involves a decomposition of one or more sample images of at least a part of a candidate document to be authenticated based on Wavelets, are already known as highlighted in sections 1 and 2 hereof. According to these known methods, each sample image is digitally processed by performing a Wavelet transform of the sample image in order to derive a set of classification features (including for instance the variance $\sigma^2$, skewness E, and excess/kurtosis C) allowing a classification of the candidate document within a multidimensional feature space (as for instance illustrated in FIG. 3), thereby achieving suitable discrimination between genuine and forged security documents.

The general aim of the present invention is to provide an improved method of authenticating security documents. More precisely, an aim of the present invention is to provide such a method which is better suited to being implemented in mobile devices, such as smartphones or like hand-held or portable devices.

There is therefore provided a method of authenticating security documents, especially banknotes, of the aforementioned type, which is characterized in that it is based on an adaptive Wavelet approach, which adaptive Wavelet approach includes the following steps:

prior to carrying out the Wavelet transform, defining a categorization map containing local information about different intaglio line structures that are found on the security documents;

carrying out a Wavelet selection amongst a pool of Wavelet types based on the categorization map; and performing the Wavelet transform of the sample image on the basis of the selected Wavelet.

An advantage of the proposed adaptive Wavelet approach resides in a better ability to classify samples of candidate documents to be authenticated in an unambiguous way. Indeed, thanks to the proposed adaptive Wavelet approach, which maps suitable Wavelet types to the different intaglio line structures that are typically found on security documents, a suitable Wavelet which best fits the characteristics of the particular intaglio line structure in the sample image is first selected on the basis of the categorization map, before carrying out the Wavelet transform, thereby optimizing the discrimination in the feature space of the various classes of documents being authenticated.

In accordance with a preferred embodiment of the invention, the step of defining the categorization map includes defining a statistical model of each given intaglio line structure. This statistical model preferably consists of at least one parameter characterizing at least one histogram representative of each given intaglio line structure (which parameter is advantageously a shape parameter describing a shape of the corresponding histogram). This parameter can suitably be determined on the basis of a Maximum Likelihood Estimation (MLE) approach.

In this context, it has been found to be adequate to build the statistical model from measurements of a line width and of a line distance within each given intaglio line structure. Even more preferably, the statistical model can include a 4-tuple of parameters characterizing four histograms representative of each given intaglio line structure, which four histograms respectively describe a histogram of the statistical distribution of line widths in a horizontal direction, a histogram of the statistical distribution of line distances in the horizontal direction, a histogram of the statistical distribution of line widths in a vertical direction, and a histogram of the statistical distribution of line distances in the vertical direction.

In accordance with another preferred embodiment of the invention, the pool of Wavelet types includes a baseline Wavelet which is used as baseline for the Wavelet selection. This baseline Wavelet is preferably the db2-Wavelet. The baseline Wavelet is advantageously replaced by another Wavelet type, if a separation ability of that other Wavelet type in the feature space, for a given intaglio line structure, is better than that of the baseline Wavelet. A better separation ability in the feature space is understood in this context in a sense of larger cluster distances in the feature space.

The set of classification features preferably includes statistical moments descriptive of a statistical distribution (or histograms) of Wavelet coefficients resulting from the Wavelet transform, which statistical moments are advantageously the variance $\sigma^2$, the skewness E and the excess C. Further classification features may also be used in addition to these statistical moments, including so-called LACH features.

Also claimed is such a method that is applied in a mobile device environment (especially in a smartphone) as well as a mobile device comprising an image processing unit programmed to carry out such a method.

3.1 Robustness

By transferring authentication algorithms to a smartphone, the possible application areas are stretched, and the inspection of banknotes can be executed by untrained personnel. Implementing authentication algorithms on a smartphone demands a new concept for certain parts of some algorithms. Smartphone limitations that have, in this case, an effect are:

quality fluctuations of the camera module,
software limitations such as restricted or impeded access to raw image data,
changing environmental conditions, esp. light conditions, and
banknote position with respect to the smartphone's optics.

Camera modules in smartphones are not designed for industrial image processing applications. To reduce costs, such modules generate an already optimized image via special purpose hardware. The phone's operating system does not adjust on any deviation. Therefore, production deviations caused by the camera module manufacturer lead to changing image representation which can show itself in a color cast, that is, the color channels are not properly adjusted, noise, improper focus adjustment, and so on. These fluctuations have to be taken into account by an appropriate choice of algorithms. Several counter-measures try to compensate for the above-mentioned effects, that is, shading correction and white balance adjustment are applied in post-processing steps. Shading correction compensates inhomogeneous illumination. White balance adjustment corrects color casts by adjusting the color channels to pre-defined reference values.

Use of a smartphone for real-time authentication of banknotes demands special procedures of machine learning. Classification of objects should be as robust as possible, despite unstable image capturing conditions. Furthermore, the application should be reliable, despite a limited number of counterfeits available for training. False-positive classifications (i.e. counterfeits detected as genuine) have to be avoided. Therefore, a training set has to be designed which considers possible variations in the production process. When selecting an adequate classification method, it has to be taken into account that the number of counterfeits at hand is limited. The number of possible printing methods is also limited. Since false-positive classifications would question the whole application and lead to negative feedback in the public, the reliability of the classifier is most important. For this reason, the methods of machine learning which are used in the authentication process have to be well-considered.

3.2 Adaptive Wavelet Approach

As mentioned above, banknote classification operates on statistical moments which are obtained from Wavelet coefficient histograms, which in turn are based on e.g. a db2-Wavelet transform of a given signal with a typical resolution of 600 dpi. Though this classification works well in many cases, in some it does not, that is, misclassifications occur. Since the intaglio printing technique is closely related to the Wavelet Transform [12], an adaptive Wavelet approach has to overcome such occurrences of misclassification. The approach is based on a Wavelet mapping for different intaglio line structures. The baseline is the db2-Wavelet which is replaced by another Wavelet type according to a certain local intaglio line structure of a banknote. Wavelets from the same Wavelet family are used (e.g. Daubechies [23]) or a Wavelet from a Wavelet family with other characteristics, e.g. biorthogonal Wavelets, Coiflets or Symlets [23], [24], and [25].

The aim is a better ability to classify samples unambiguously. Therefore, prior to the Wavelet transform, one has to characterize a signal sample structure within a banknote and define a categorization map (C-map) for the whole banknote (cf. FIGS. 7(b)-7(f)). The C-map contains local information about the intaglio structure which is mapped to a certain Wavelet. Based on this categorization, it is possible to apply a Wavelet transform which generates quasi-optimal spatial frequency coefficients, and therefore, quasi-optimal detection features lead to an unambiguous classification.

For the approach, the essential steps can be divided into three parts:

i) A statistical model shall be defined and executed which works adequately for different given intaglio line structures;
ii) a given sample structure has to be measured and distinguished; and
iii) a Wavelet has to be selected which fits best under the constraint of a limited Wavelet pool.

Statistical Model.

The signal at hand is a 2D-raster image that can be regarded as two sets of 1D-signals, one horizontal and one vertical. For each dimension, first the centers of the edges (slopes) are determined. Secondly, two types of distances are calculated: The line width w which is the distance between the center of a falling and the center of a rising edge, and the line distance d which is the distance between the center of a rising and the center of a falling edge. This procedure is based on the underlying assumption that one inspects darker print structures on light, whitish cotton-based paper. Since the centers of slopes are used as reference points, one is insensitive to the printing technique of the sample.

One is not interested in a single line or line distance, but in discrete statistical densities (histograms) regarding w and d for the whole observed structure. Hence, histograms of the measurements for w and d are calculated. Since the resulting densities have the appearance of the Gamma probability density p(x;k,θ) [30], parameter estimation for this distribution is executed. The Gamma probability density is defined as follows:

$$p(x; k, \theta) = \frac{1}{\theta^k} \frac{1}{\Gamma(k)} x^{k-1} e^{-\frac{x}{\theta}}; x, k, \theta \in R_+. \quad (3)$$

For a given variable x (here: w and d), the parameter estimation results in two parameters: shape k and scale θ. In the present case, one can observe that these two are strongly correlated, that is θ=f(k). Hence, a histogram can be characterized by only one of the parameters, e.g. shape k. The function Γ(k) depicts the Gamma function [31]:

$$\Gamma(k) = \int_0^\infty t^{k-1} e^{-t} dt. \quad (4)$$

Parameter k, commonly known as shape parameter, has been chosen in the present instance. For a given intaglio line structure, the results form a characteristic 4-tuple ($k_{H,w}$, $k_{H,d}$, $k_{V,w}$, $k_{V,d}$), where H and V stand for horizontal and vertical direction of measure, and w and d represent measurements of line width and distance, respectively. The estimation approach used here is based on Maximum Likelihood Estimation (MLE) which is a standard method of estimation parameters of a statistical data's distribution or density [32]. FIG. 4 schematically illustrates the procedure.

Based on the above mentioned procedure different 4-tuples for prototype structures are generated. The prototype structures are based on typical banknote designs (horizontal lines, vertical lines, dashed lines, dotted lines, etc. aggregated to complex structures, cf. FIG. 4). These prototypes are of course not unique for a banknote for two reasons: i) a banknote is individually designed by the engraver with the creator's distinctive technique and ii) the designed regions are overlapped. These two observations lead to the fact that ambiguities in the 4-tuples occur. Therefore, a unique characterization of a region is not always possible. A best case situation appears if and only if:

$$\exists k_i : \beta_l < k_i < \beta_u \Leftrightarrow \exists k_i : k_i \in S_i; i \in \{H,w;H,d;V,w;V,d\}. \quad (5)$$

A parameter $k_i$ of index set i is located between a lower border $\beta_l$ and an upper border $\beta_u$. In this case, at least one $k_i$ belongs to a set $S_i$ of possible mappings for a certain Wavelet type. In all other cases a unique separation is not possible. Consequently, as one is interested in a general approach, a measurement and optimization phase has to follow.

Measurement.

Standard smartphone camera units (8 to 12 megapixel resolution) are sufficient for approx. 600 dpi resolution. A banknote or a part of it is imaged by a camera unit (here: a camera integrated into a mobile device) and divided in up to 360 (30×12) sub-images (cf. FIGS. 7(a)-7(f)) of a size ranging from 96×96 to 128×128 pixels with an overlap of an image quarter in each orientation. The sub-images are analysed regarding their line widths and distances properties and for each sub-image a 4-tuple $k_j$, j∈0 . . . 359 is determined. Depending on $k_j$ a certain Wavelet type is pre-selected a-priori.

Wavelet Selection Procedure.

The selection is based on the finding that db2-Wavelets are able to act as feature generator for banknote authentication in general [1], [12], and [29]. However, some characteristic regions cannot be handled by db2-Wavelets. Therefore, a pool of Wavelet types is selected to optimize the detection rate. Initially about 60 Wavelet types are considered in various experiments, resulting in a group of the following six (τ∈0 . . . 5) selected Wavelets. One can refer to Wasilewski's Wavelet Properties Browser [33] for details, viz., decomposition filter coefficients and sketches of various decomposition-filter impulse responses. The six Wavelets are selected on the principles of engraved intaglio lines shapes and widths. The Wavelet filter length, N=card(ψ), is sorted in increasing order (cf. Table 1). Therefore, the Wavelets' basis bandwidth in the frequency domain decreases accordingly. The above mentioned Wavelet types (shape and size) are examined for best separation properties on different scales in a considered feature space. Therefore, the Wavelet type's pool is allocated to the C-map. The procedure is executed as follows: A set of genuine and forged banknotes (approx. 20-50 pieces) is used to create two clusters (classes: genuine (G) and forgery (F)) for each of six r-dimensional feature spaces $f_\tau$, based on the Wavelet types, and for each of j sub-images. Via LDA which was already used for classification purposes in banknote authentication [4], a scalar discriminant measure for each of the Wavelet types, known as Rayleigh coefficient $D_\tau$[34], is determined. The non-negative real Rayleigh coefficient, $0 \leq D_\tau \leq \infty$, provides information about the distance between two clusters in a feature space. The higher $D_\tau$, the larger is the distance between two clusters. As a reference measure $D_0$ is applied (db2). In case of:

$$\Sigma_\tau = \frac{D_\tau - D_0}{D_0} > 0, \tau \in \{1, \ldots, 5\}, \quad (6)$$

it is assumed that the separation ability $\Sigma_\tau$ of a certain Wavelet type, τ≠0, is better in a sense of larger cluster distances in the feature space. In all other cases ($\Sigma_\tau \leq 0$), the db2-Wavelet has to be applied. It has to be pointed out that the separation ability is dependent on the utilized features. The determination of the Rayleigh coefficient for each of the sub-images and Wavelet types is identified as follows: In a feature space f, consisting of three (dimension: r=3) statistical moments (variance, skewness, excess/kurtosis) as features, calculated from spatial frequency histograms of each local region and Wavelet scale, one looks for a direction $v=(v_1, v_2, \ldots, v_r)^T$ representing linear combinations of the features which separates the class means optimally (when projected onto the found direction) while achieving the smallest possible variance around these means. The empirical class means for a one-dimensional feature space f of classes genuine G with n objects and forgery F with in objects are:

$$m(G) = \frac{1}{n} \sum_{f \in G} f \quad (7)$$

and $$m(F) = \frac{1}{m} \sum_{f \in F} f. \quad (8)$$

Similarly, the means of the data projected onto some direction v in a higher-dimensional feature space can be computed by:

$$\mu(G) = \frac{1}{n}\sum_{f\in G} v^T f, \quad (9)$$

and $$\mu(F) = \frac{1}{m}\sum_{f\in F} v^T f. \quad (10)$$

The variances $\sigma^2(G)$ and $\sigma^2(F)$ of the projected data can be expressed as:

$$\sigma^2(G) = \Sigma_{f\in G}(v^T f - \mu(G))^2, \quad (11)$$

and $$\sigma^2(F) = \Sigma_{f\in G}(v^T f - \mu(F))^2. \quad (12)$$

The LDA solution is the direction v* which maximizes the optimization problem:

$$D(v^*) \max_v \frac{(\mu(G) - \mu(F))^2}{\sigma^2(G) + \sigma^2(F)}. \quad (13)$$

Within the described direction $v = (v_1, v_2, \ldots, v_r)^T$, representing a linear combination of the features, and $$m(G) = (\mu_1(G), \mu_2(G))^T, m(F) = (\mu_1(F, \mu_2(F), \ldots, \mu_r(F))^T, \quad (14)$$

Equation (13) is rewritten with the inter- and intra-class co-variances:

$$S_b = (m(G) - m(F))(m(G) - m(F))^T \quad (15)$$

and $$S_v = \frac{1}{n}\sum_{f\in G}(f - m(G))(f - m(G))^T + \frac{1}{m}\sum_{f\in F}(f - m(F))(f - m(F))^T \quad (16)$$

as $$D(v^*) = \max_v \frac{v^T S_b v}{v^T S_v v}. \quad (17)$$

The adaption process is executed as follows: For each k-tuple $k_j$ a Wavelet type $\tau$ is allocated based on the distance measure $\Sigma_\tau$ under the constraint that each $k_i$ is in a range $\beta_l < k_i < \beta_u$, resulting in an initial Wavelet assignment. Of course, the mapping is not in all cases complete and unique. However, the more banknote designs are analysed, the more the map will be complete. Ultimately, the C-map consists of a near-optimal mapping max $\Sigma_\tau$: $k_j \to \tau$ which is independent of a certain banknote design and denomination.

3.3 Luminance Adapted Classification

It was shown in [1], [4], and [12] that pattern recognition within industrial devices can be performed using Wavelet transform-based features. In spite of different environmental and hardware conditions and, respectively, different feature distributions, which appear by application of mobile devices, it was possible to prove in [4] that the same features are suitable for mobile use. Unfortunately, only under special restrictions the pattern recognition process described in [4] is feasible for a real world application. One restriction is a rigid position of the camera during the authentication, another, the environmental dependence on the authentication result. Especially illumination plays an important role in the authentication process. The limitations in terms of a rigid position and illumination dependence stem from the training data set which was used in [4]. In this training data set possible shifts of the banknote during authentication were not considered. Further, since the training data was collected under daylight and standard office illumination, authentication could cause problems in other environmental situations. These two unfavorable topics have been reported by persons who were asked to perform tests with the aforementioned application. Under consideration of these circumstances, there is described below how to construct a more sufficient training data set and an accurate classification boundary.

A short recap of the pattern recognition process described in [4] is opportune at this stage. The recognition is based on the authentication of a rigid banknote region. For authentication the region is transformed into the Wavelet domain; then, six features are calculated by using the Wavelet coefficients histograms. Three of them are conventional statistical moments (variance $\sigma^2$, skewness E, and kurtosis C). Three additional ones are called LACH features $\overline{H}_L$, $\overline{H}_M$ and $\overline{H}_R$ (cf. section 2.4). Since most of the features are Gaussian distributed [4], LDA is once more used for the calculation of the classifier boundary for the later authentication. Furthermore, by applying the LDA approach the training is fast, more flexible, and becomes more robust than using a Support Vector Machine (SVM). One can refer to [29].

To overcome the problem of the rigid positioning in [4], one constructs a more sufficient training data set by the following strategy: the training data set is extended by additional regions, which lie closely to the boundary of the main region. FIG. 5 illustrates additional regions.

To overcome the illumination problem, one needs to identify the features which are sensitive against luminance variations. For this reason one collects some data under several different illumination conditions. The validation of the feature distributions shows that the variance $\sigma^2$ is most likely sensitive against certain luminance variations, that is, the distributions of $\sigma^2$ are not the same for the different luminance variations (the influence of the illumination on $\sigma^2$ is shown by classification results in FIGS. 8(a)-(c)). The other five features are less sensitive and possess similar distributions for different luminance variations. Within these results, it is more appropriate to construct a classification boundary by the combination of the five features, which are less sensitive against luminance variations. Since the variance $\sigma^2$ is an important feature for the application, it is used in classification as a stand-alone feature with large detection margin.

4. EXPERIMENTAL RESULTS

In this section actual results based on findings are presented. One has used in the experimental design real banknotes (EURO banknotes) and banknote specimens "Jules Verne" and "Flowerpower" which are produced in large volumes by the Applicant as genuine notes and different types of forged notes. For obvious reasons the forging process is not described here.

In FIG. 6 the Maximum Likelihood Estimation (MLE) of a sub-image (j=47) on the forehead of the portrait of Jules Verne (cf. FIG. 7(a)) is exemplified. The black curve represents the best possible Gamma probability density for vertical line widths in the region with the parameters $k_{V,w}=5.97$ and $\theta_{V,w}=0.9$. Parts of the forehead's intaglio structures generate sub-image densities within the same range regarding their parameters. The analysis (cf. FIG. 7(c)) results in a 4-tuple where simply two parameters control the forehead region regarding a certain Wavelet uniquely: Daubechies-4-Wavelets. As $k_{H,w} \geq 7.2$ and $k_{V,w} \geq 5.8$ are determined, the lower border parameters $\beta_l$ are set to $\beta_{l;H,w}=7.2$ and $\beta_{l;V,w}=5.8$. The upper border parameters $\beta_u$ are set to $\beta_{u;H,w}=10$ and $\beta_{u;V,w}=8$ which defines half of the maximum frequency h(d) and h(w). Therefore: $7.2 < k_{H,w} < 10$ and $5.8 < k_{V,w} < 8$. The structure is modelled with an eight coefficient Wavelet with a maximum distance measure in the feature space: $\arg\max_\tau \Sigma_\tau = 2$. In this case the best Wavelet can be chosen with two parameters. FIG. 7(c) exhibits the results for sub-images in question. For instance, the db4-Wavelet is able to distinguish better between a genuine and a forged banknote (up to 61%) compared to the db2-Wavelet in sub-image 47. As depicted in FIGS. 7(b), 7(d), 7(e), and 7(f) different Wavelet types are able to distinguish different intaglio regions (e.g. j=257, 44% with sym5-Wavelet).

In the case of illumination variations (A and B (reduced luminance by approx. 30%)), there would be no need to change the classification strategy represented in [4]. However, by the modification of the training data set against rigid positioning, the classification rule has also to be modified. Since the extended training data set is not Gaussian any more, the accuracy of the classification could be doubted. Special problem zones are regions, which lie closely to the classification boundary. This problem is solved by multi-stage LDA performed on the objects around the classification boundary. The comparison of results is illustrated in FIGS. 8(a)-(c) (original classification from [4]) and in FIGS. 9(a)-(c) (improved approach).

5. CONCLUSION

The Sound-of-Intaglio™ approach is well suited for different applications in banknote production and authentication, namely quality inspection, sorting and authentication at different levels. It has been shown that the general authentication approach can be optimized by adaption of the feature generators in question, namely the usage of a pool of Wavelets which are optimized for different intaglio structures. Furthermore, by taking into account a border surrounding of each analysis region and adaption of the used features [4], luminance variations can be stabilized. Therefore, a more robust classification between genuine and forged banknotes is achieved.

BRIEF DESCRIPTION OF FIGURES

FIGS. 7(a)-7(f): In FIG. 7(a) the banknote specimen "Jules Verne" produced by the Applicant is shown. The images of FIGS. 7(b)-7(f) represent the results of different Wavelet feature generators compared to the db2-Wavelet used as baseline. All values are denoted in %. The grayish sub-images are analyzed regarding intaglio print. No percentage values represent the separation ability of the db2-Wavelet (0% improvement). Percentage values show the improvements per sub-image related to a certain Wavelet type; FIG. 7(b): rbio3.1, FIG. 7(c): db4, FIG. 7(d): rbio5.5, FIG. 7(e): sym5, FIG. 7(f): coif2. Counting of the sub-images j begins at the upper left edge in row direction.

FIGS. 8(a)-8(c): FIG. 8(a) shows the original LDA training from [4] for the data set collected by rigid positioning of the camera with respect to the banknote. In FIG. 8(b) the test data set based on additional regions (cf. FIG. 5) and the same illumination as the training data set is presented. Here, some genuine objects move too close to the classification boundary which is inconvenient for the application. In FIG. 8(c) the same test data set with two different illuminations (type A and type B (reduced luminance by approx. 30%)) is shown. The distributions for illuminations A and B do not coincide. Moreover, some forgery objects move too close to the classification boundary which is crucial for the application. If a single forgery object is classified as a genuine one, it can then lead to a negative feed-back on the whole application.

FIG. 9(a) shows a classification boundary with an improved approach. In FIG. 9(b) and FIG. 9(c) the same data sets as in FIGS. 8(a)-8(c) are illustrated. In this approach the test objects do not move close to the classification boundary. Moreover, distributions coincide for illumination A and B. Hence, a higher stability against shifted positioning of the camera and different illuminations is achieved here.

TABLE(S)

TABLE 1

Figure 1:
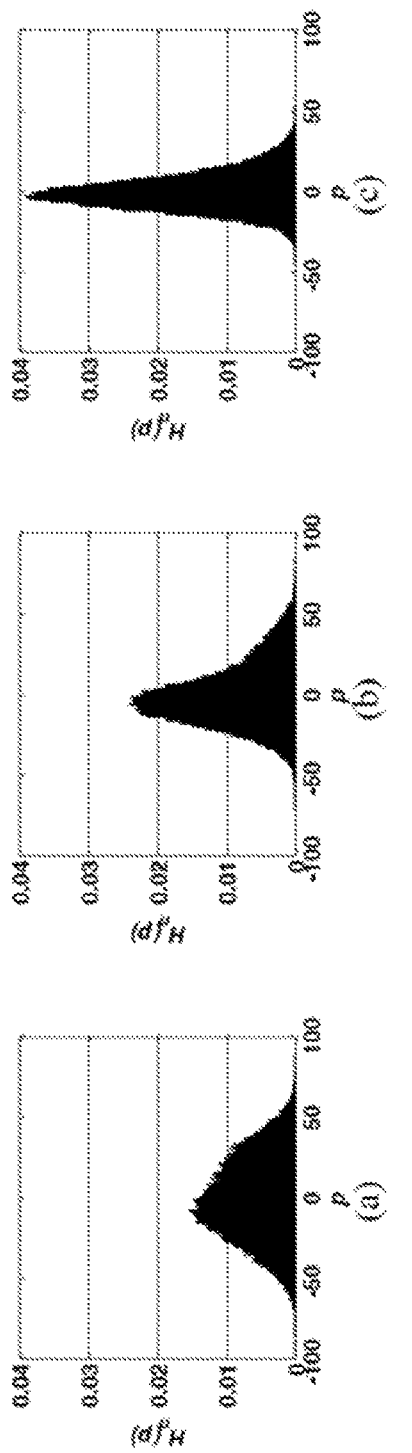
FIGS. 1(a)-1(c): Histograms of Wavelet coefficients after a db2-SWT: Genuine (FIG. 1(a)), High-Quality Forgery (FIG. 1(b)), and Low-Quality Forgery (FIG. 1(c)). The greyscale frequency distribution of genuine banknotes differs considerably from forged ones (see also FIG. 3 of [4]).
Figure 2:
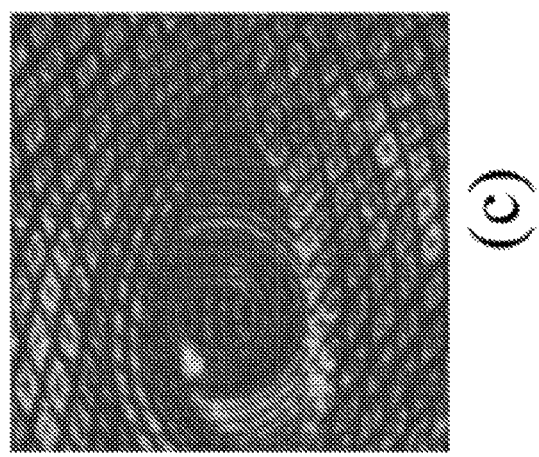
FIGS. 2(a)-2(c): Intaglio line structures: Genuine (FIG. 2(a)), High-Quality Forgery (FIG. 2(b)), and Low-Quality Forgery (FIG. 2(c)) (see also FIG. 4 of [4]).
Figure 2:
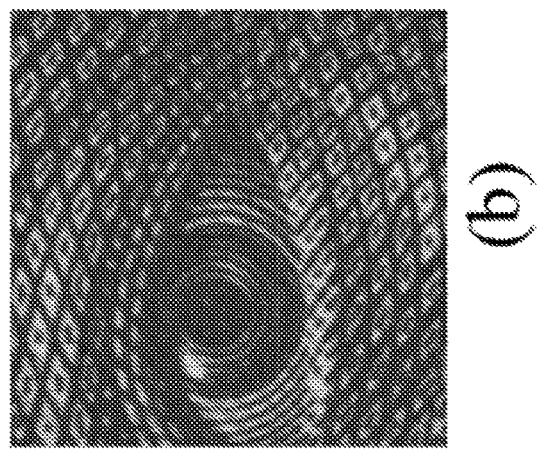
Figure 2:
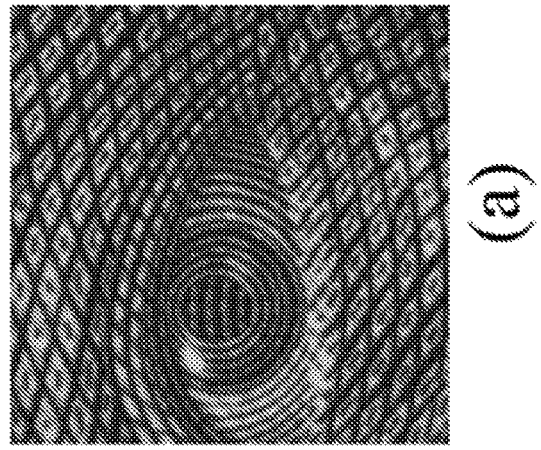
Figure 3:
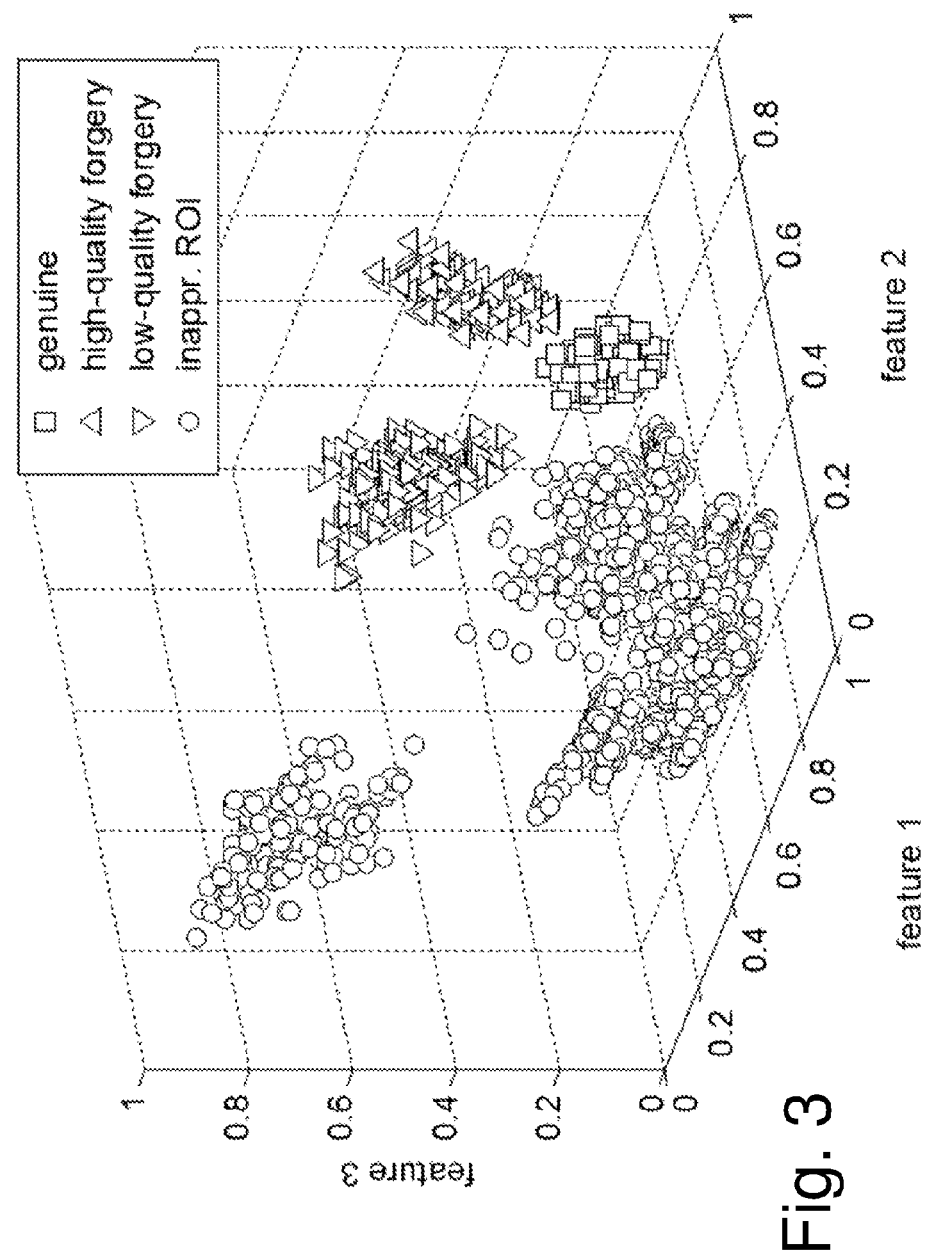
FIG. 3: Feature space spanned over variance 2 (feature 1), skewness E (feature 2), and excess (or kurtosis) C (feature 3). The training set consists of 1489 objects [29]
Figure 4:
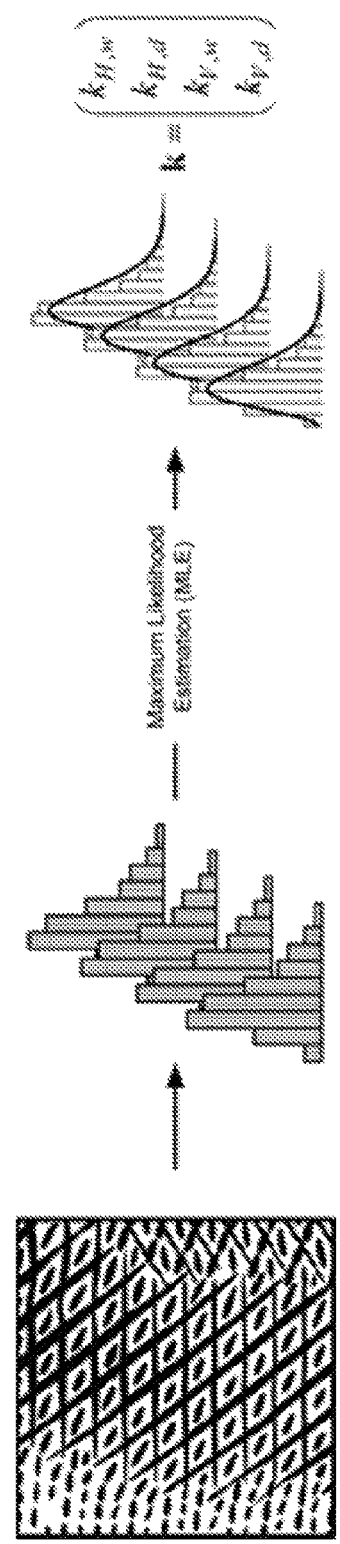
FIG. 4: Maximum Likelihood Estimation (MLE) from a given intaglio structure for horizontal and vertical line width and inter-line distance. The window size is typically set to 96×96 to 128×128 pixels, depending on the banknote structure, viz., line width and line distances
Figure 5:
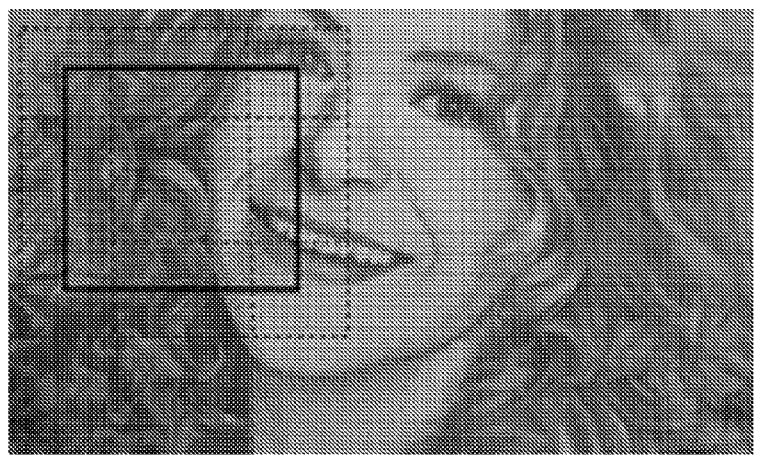
FIG. 5: The detail shows one main region, which is used for the authentication (solid lines), and four further regions (dashed lines), which are added to the training data set ("Flowerpower" banknote specimen produced by the Applicant).
Figure 6:
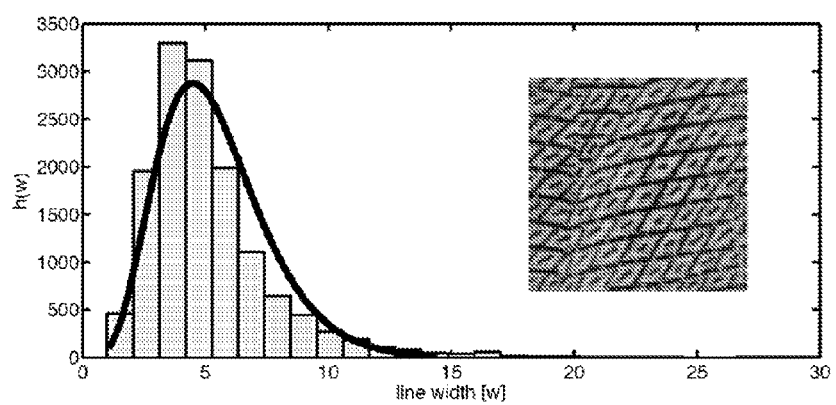
FIG. 6: Maximum Likelihood Estimation (MLE) from a given intaglio structure for horizontal and vertical line width in pixel (region j=47, forehead, banknote specimen "Jules Verne"; cf.
Figure 7A:
FIG. 7(a)). Counting of the sub-images j begins at the upper left edge in row direction, cf. e.g.
Figure 7B:
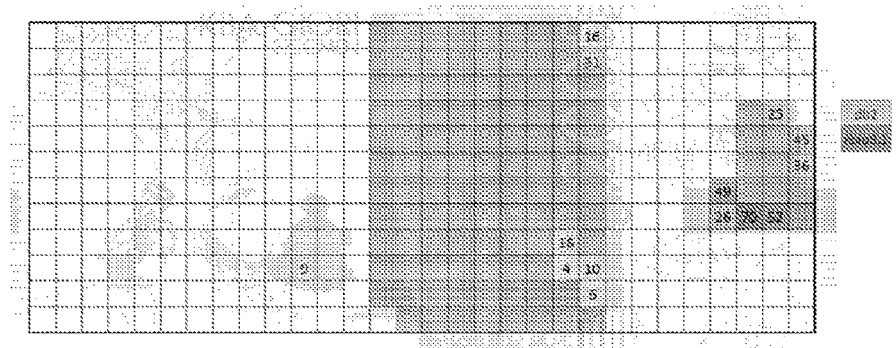
Figure 7C:
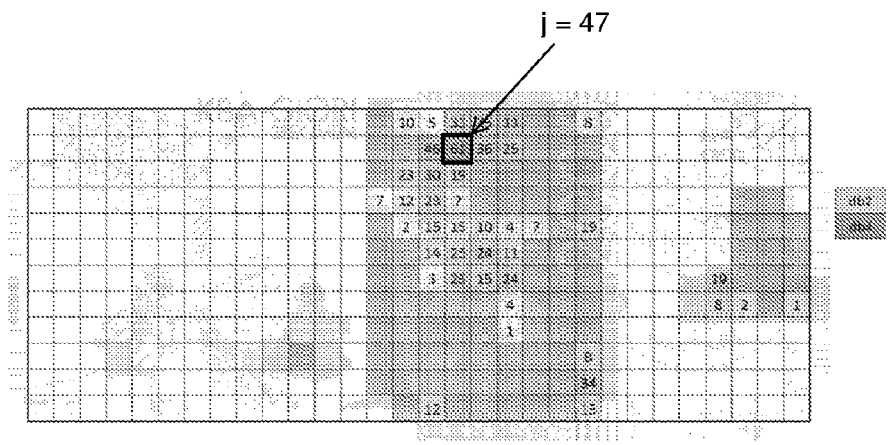
FIG. 7(c).
Figure 7D:
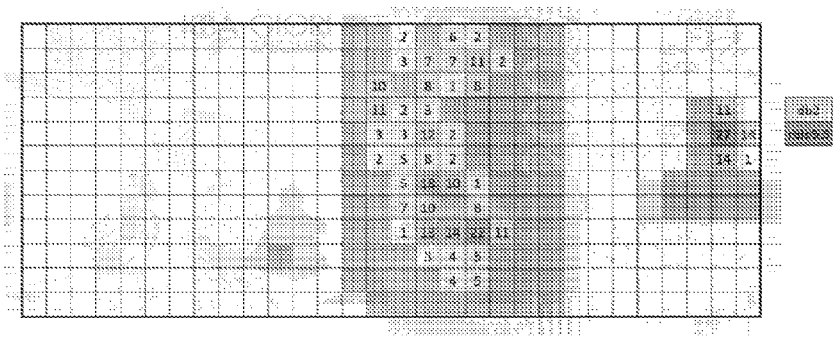
Figure 7F:
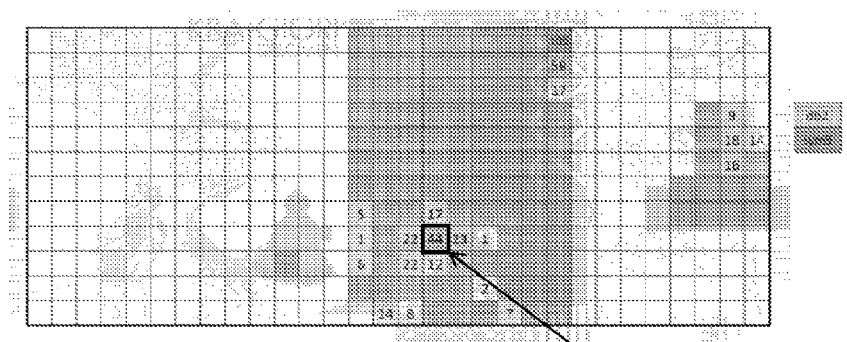
Figure 7F:
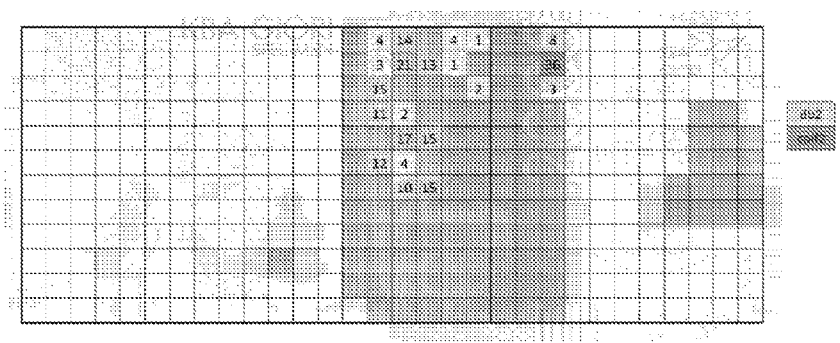
Figure 8B:
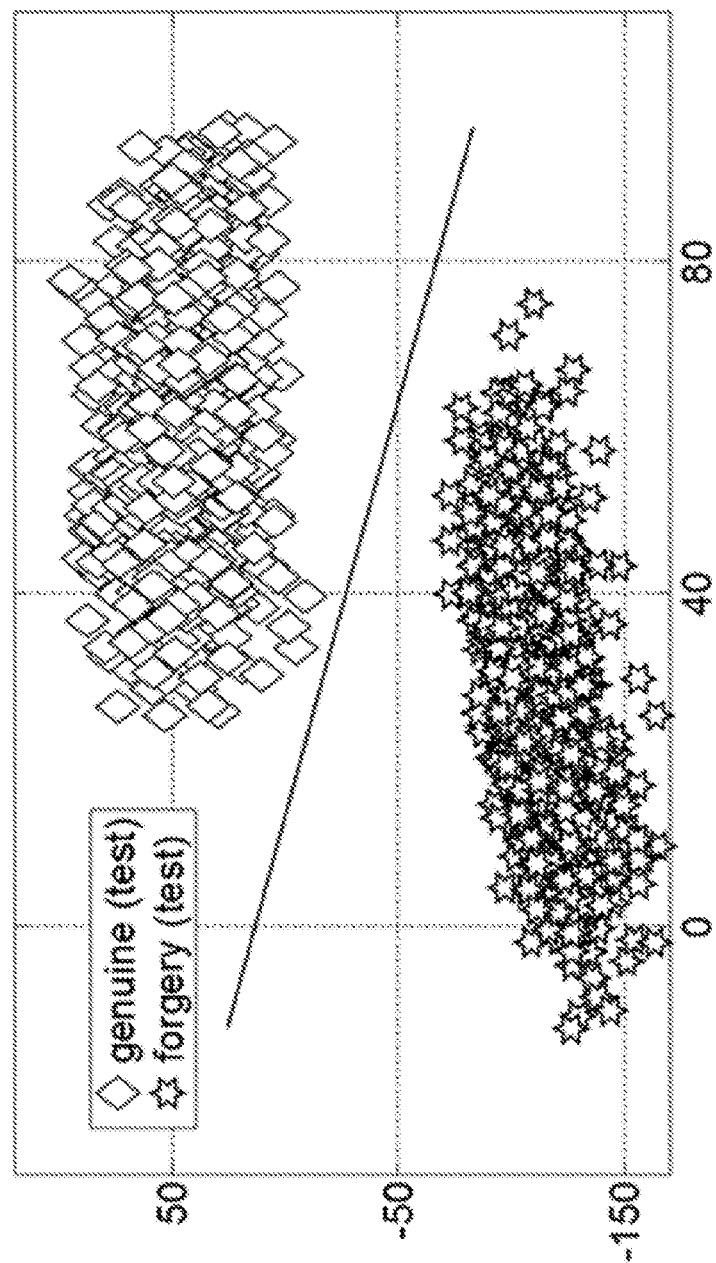
Figure 8C:
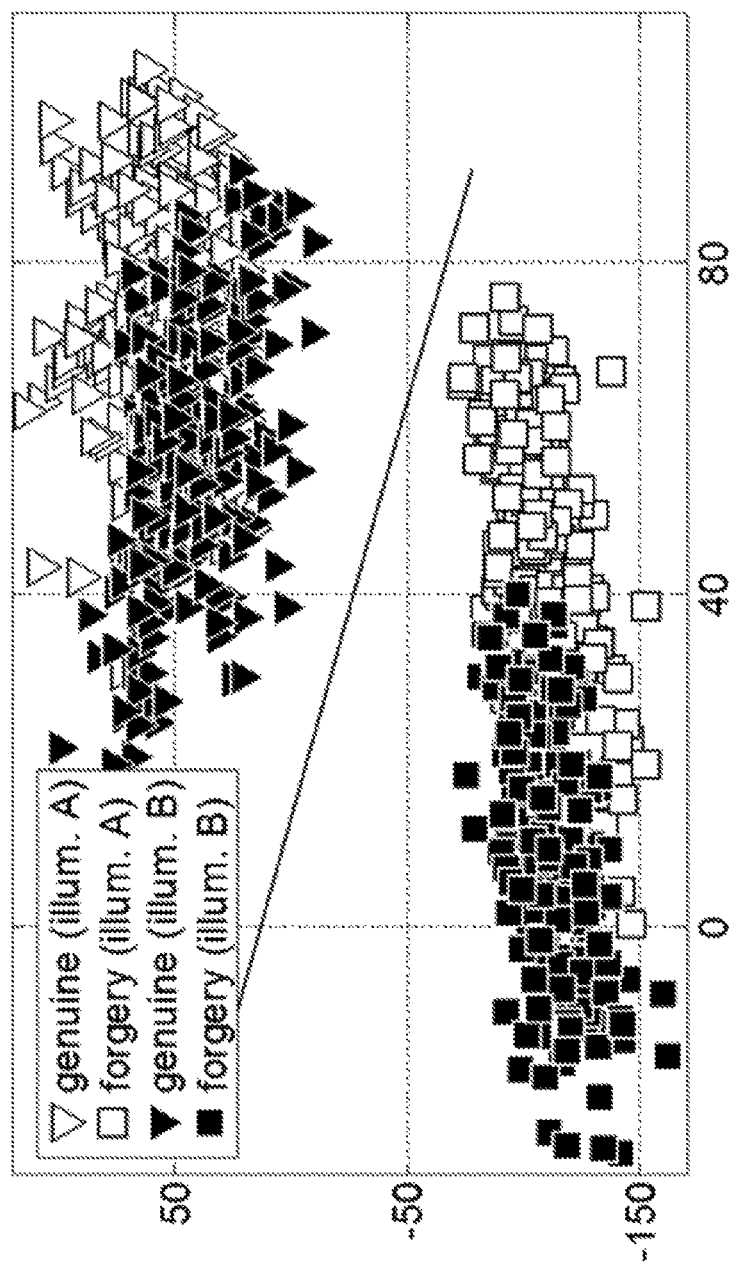
Figure 9:
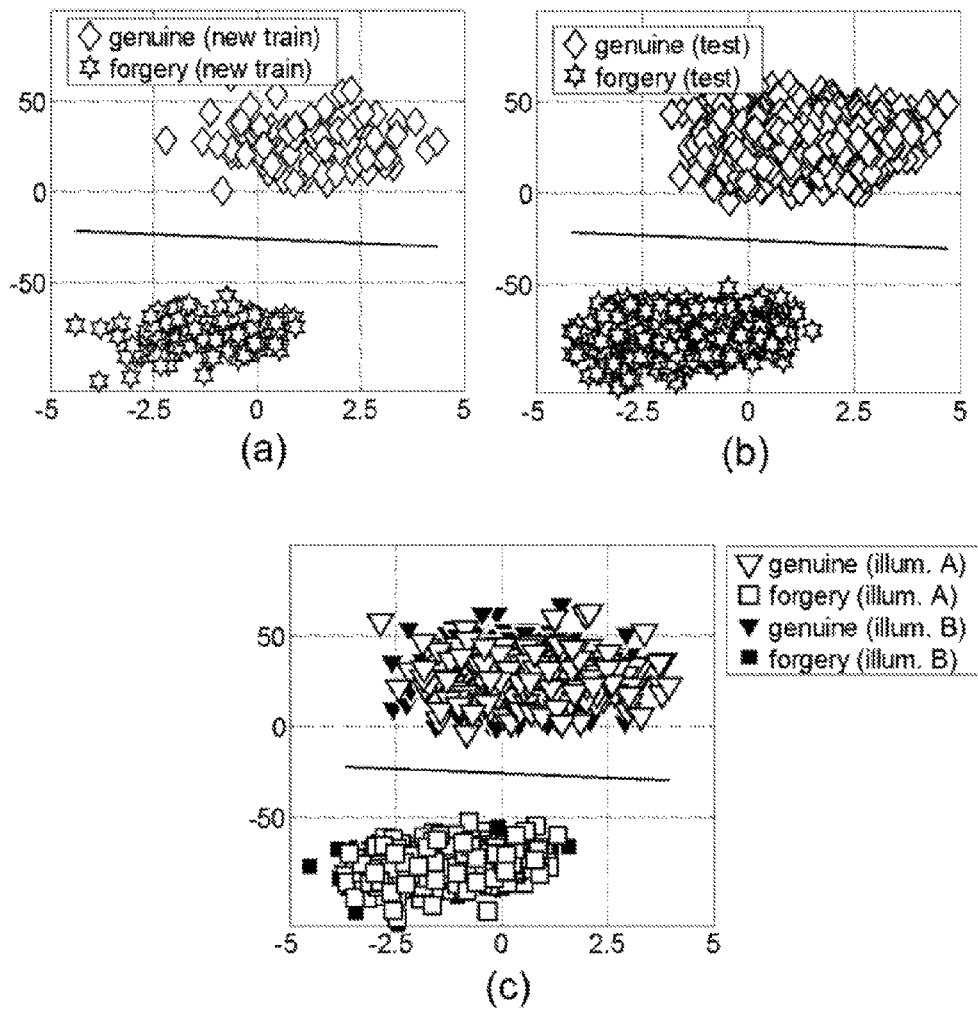
FIGS. 9(a)-9(c)

Selected 1D-Wavelet types [33] for banknote authentication (DLP: Decomposition low-pass (scaling function φ), DBP: Decomposition band-pass ψ (Wavelet)):

| τ | Type | Filter length N (DLP, DBP) | Properties |
|---|------|---------------------------|------------|
| 0 | Daubechies-2 (db2) | 4, 4 | asymmetric, orthogonal; rough function; compact support |
| 1 | Reverse biorthogonal 3.1 (rbio3.1) | 4, 4 | symmetric, biorthogonal; use of decomposition filters; smooth function; linear phase; compact support |

TABLE 1-continued

Selected 1D-Wavelet types [33] for banknote authentication (DLP:
Decomposition low-pass (scaling function φ), DBP:
Decomposition band-pass ψ (Wavelet)):

| τ | Type | Filter length N (DLP, DBP) | Properties |
|---|---|---|---|
| 2 | Daubechies-4 (db4) | 8, 8 | asymmetric, orthogonal; compact support |
| 3 | Reverse biorthogonal 5.5 (rbio3.1) | 11, 9 | symmetric, biorthogonal; use of decomposition filters; smooth function; linear phase; compact support |
| 4 | Symlet-5 (sym5) | 10, 10 | near symmetric, orthogonal, biorthogonal; compact support |
| 5 | Coiflet-2 (coif2) | 12, 12 | near symmetric, orthogonal, biorthogonal; compact support |

REFERENCES CITED

[1] Lohweg, V., Gillich, E., Schaede, J., "Authentication of Security Documents, in Particular of Banknotes" European Patent Publication No. EP 2 000 992 A1, priority date of Jun. 1, 2006.

[2] Lohweg, V., "Renaissance of Intaglio", Keesing Journal of Documents & Identity, Keesing Reference Systems Publ. 33, 35-41 (2010).

[3] Lohweg, V. and Schaede, J., "Document Production and Verification by Optimization of Feature Platform Exploitation", Optical Document Security—The Conference on Optical Security and Counterfeit Detection II San Francisco Calif. USA, 1-15 (2010).

[4] Lohweg, V., Dörksen, H., Gillich, E., Hildebrand, R., Hoffmann, J. L., Schaede, J., "Mobile Devices for Banknote Authentication—is it possible?", Optical Document Security—The Conference on Optical Security and Counterfeit Detection III San Francisco Calif. USA, 1-15 (2012).

[5] Gan, T. H., Hutchins, D. A., Billson, D. R., Schindel, D. W., "High resolution air-coupled ultrasonic imaging of thin materials", IEEE ULTRASONICS SYMPOSIUM, 897-990 (2002).

[6] Yang, C-N., Chen, J-R., Chiu, C-Y., Wu, G-C., Wu, C-C., "Enhancing Privacy and Security in RFID-Enabled Banknotes", IEEE International Symposium on Parallel and Distributed Processing with Applications, 439-444 (2009).

[7] Ahmadi, A., Omatu, S., Kosaka, T., "Improvement of the reliability of bank note classifier machines", Proc. IEEE International Joint Conference on Neural Networks 2 doi: 10.1109/IJCNN.2004.1380134, 1313-1316 (2004).

[8] Omatu, S., Yoshioka, M., Kosaka, Y., "Bank note classification using neural networks", IEEE Conference on Emerging Technologies and Factory Automation doi: 10.1109/EFTA.2007.4416797, 413-417 (2007).

[9] Shan, G., Peng, L. Jiafeng, L., Xianglong, T., "The design of HMM-based banknote recognition system", IEEE International Conference on Intelligent Computing and Intelligent Systems 4 doi: 10.1109/ICICISYS.2009.5357719, 106-110 (2009).

[10] Choi, E., Lee, J., Yoon, J., "Feature Extraction for Bank Note Classification Using Wavelet Transform", 18th International Conference on Pattern Recognition 2 doi: 10.1109/ICPR.2006.553, 934-937 (2006).

[11] Ahangaryan, F. P., Mohammadpour, T., Kianisarkaleh, A., "Persian Banknote Recognition Using Wavelet and Neural Network", International Conference on Computer Science and Electronics Engineering (ICCSEE) 3 doi: 10.1109/ICCSEE.2012.294, 679-684 (2012).

[12] Glock, S., Gillich, E., Schaede, J., Lohweg V., "Feature Extraction Algorithm for Banknote Textures based on Incomplete Shift Invariant Wavelet Packet Transform", Proceedings of the 31st DAGM Symposium on Pattern Recognition, Lecture Notes on Computer Science 5748, 422-431 (2009).

[13] Bezboruah, T., "Mobile computing: the emerging technology, sensing, challenges and applications", Preprint, 2010. http://users.ictp.it/~pub_off/preprints-sources/2010/IC2010102P.pdf

[14] Pettey, C. and van der Meulen, R., "Gartner Says Worldwide Sales of Mobile Phones Declined 3 Percent in Third Quarter of 2012; Smartphone Sales Increased 47 Percent", Press release of Nov. 14, 2012. http://www.gartner.com/it/page.jsp?id=2237315

[15] Apple, "i Phone features", 2012. https://www.apple.com/iphone/features/

[16] Samsung, "Galaxy Note N7000", 2012. http://www.samsung.com

[17] AnTuTu, "Benchmark-Tool Antutu", 2012. http://www.Antutu.com/

[18] SunSpider, "Benchmark-Tool SunSpider 0.9.1", 2012. http://www.webkit.org/perf/sunspider/sunspider.html

[19] de Heij, H. A. M., "Public Feedback for better Banknotes Design 2", DNB Occasional Studies 5(2), De Nederlandsche Bank NV, (2007).

[20] Fake Currency Doctors, "Banknote Authentication", 2012. http://voicendata.ciol.com/comtent/service_provider/110020318.asp

[21] Illés, L., "iValuta", 2012. http://itunes.apple.com/us/app/ivaluta/id327705750?mt=8

[22] Macsoftex, "All Dollars", 2012. http://itunes.apple.com/tw/app/all-dollars/id341552027?mt=8

[23] Daubechies, I., [Ten Lectures on Wavelets], CBMS-NSF Regional Conference Series in Applied Mathematics 61 SIAM (Society for Industrial and Applied Mathematics), Philadelphia, 1992.

[24] Burrus, S. C., Gopinath, R. A., Guo, H., [Introduction to Wavelets and Wavelet Transforms: A Primer], Prentice-Hall, Upper Saddle River, 1998.

[25] Walnut, D. F., [An Introduction to Wavelet Analysis], Birkhäuser, Boston, 2004.

[26] Mallat, S. G., "A Theory for Multiresolution Signal Decomposition: The Wavelet Representation", IEEE Transactions on Pattern Analysis and Machine Intelligence 11(7), 674-693 (1989).

[27] Pesquet, J. C., Krim, H., Carfantan, H., "Time-invariant orthonormal Wavelet representations", IEEE transactions on signal processing 8, 1964-1970 (1996).
[28] Fowler, J. E., "The redundant discrete Wavelet transform and additive noise", IEEE Signal Processing Letters 9, 629-632, (2005).
[29] Gillich, E., Lohweg, V., "Banknote Authentication", 1. Jahreskolloquium Bildverarbeitung in der Automation ISBN 978-3-9814062-0-7 Institute Industrial IT, 1-8 (2010).
[30] Hogg, R. V. and Craig, A. T., [Introduction to Mathematical Statistics], Macmillan New York, Sec. 3.3 (1978).
[31] Whittaker, E. T. and Watson, G. N., [The Gamma function], Cambridge University Press, 235-264 (1996).
[32] Chambers, R. L., Steel, D. G., Wang, S., [Maximum Likelihood Estimation for Sample Surveys], CRC Press Boca Raton, (2012).
[33] Wasilewski, F., "PyWavelets," 2008-2012. http://Wavelets.pybytes.com
[34] Horn, R. A. and C. A. Johnson, [Matrix Analysis], Cambridge University Press, 176-180 (1985).

The invention claimed is:

1. A method of authenticating security documents based on an analysis of intrinsic features of the security documents which are produced by intaglio printing, which analysis involves a decomposition of one or more sample images of at least a part of a candidate document to be authenticated based on Wavelets, each sample image being digitally processed by performing a Wavelet transform of the sample image in order to derive a set of classification features allowing a classification of the candidate document within a multidimensional feature space,
wherein the method is based on an adaptive Wavelet approach, which adaptive Wavelet approach includes the following steps:
prior to carrying out the Wavelet transform, defining a categorization map containing local information about different intaglio line structures that are found on the security documents and allocating a pool of Wavelet types to the categorization map;
carrying out a Wavelet selection among the pool of Wavelet types based on the categorization map; and
performing the Wavelet transform of the sample image on the basis of the selected Wavelet,
wherein the step of defining the categorization map includes defining a statistical model of each given intaglio line structure, wherein the statistical model is built from measurements of a line width and of a line distance within each given intaglio line structure, wherein the statistical model includes a 4-tuple of parameters characterizing four histograms representative of each given intaglio line structure, and wherein the four histograms comprise: a histogram of the statistical distribution of line widths in a horizontal direction, a histogram of the statistical distribution of line distances in the horizontal direction, a histogram of the statistical distribution of line widths in a vertical direction, and a histogram of the statistical distribution of line distances in the vertical direction.

2. The method according to claim 1, wherein the at least one parameter is a shape parameter describing a shape of the corresponding histogram.

3. The method according to claim 1, wherein the at least one parameter is determined on the basis of a Maximum Likelihood Estimation (MLE) approach.

4. The method according to claim 1, wherein the pool of Wavelet types includes a baseline Wavelet which is used as baseline for the Wavelet selection.

5. The method according to claim 4, wherein the baseline Wavelet is the db2-Wavelet.

6. The method according to claim 4, wherein the baseline Wavelet is replaced by another Wavelet type, if a separation ability of that other Wavelet type in the feature space, for a given intaglio line structure, is better than that of the baseline Wavelet.

7. The method according to claim 1, wherein the set of classification features includes statistical moments descriptive of a statistical distribution, or histograms, of Wavelet coefficients resulting from the Wavelet transform.

8. The method according to claim 7, wherein the set of classification features includes the variance, the skewness and the excess.

9. The method according to claim 1, applied in a mobile device environment.

10. A mobile device comprising an image processing unit programmed to carry out the method according to claim 1.

11. The method according to claim 9, applied in a smartphone.

12. The method according to claim 1, wherein the security documents are banknotes.

13. The mobile device according to claim 10, wherein the mobile device is a smartphone.

* * * * *